Oct. 19, 1954 D. W. GUIVER 2,692,104
APPARATUS FOR AIRCRAFT-REFUELING IN FLIGHT
Filed Sept. 20, 1951 2 Sheets-Sheet 2
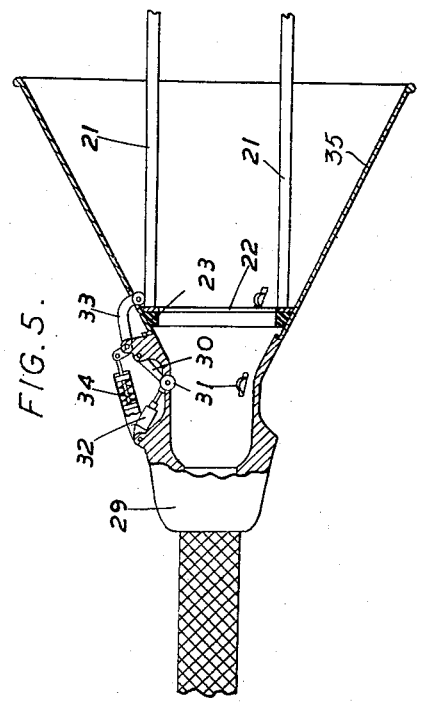
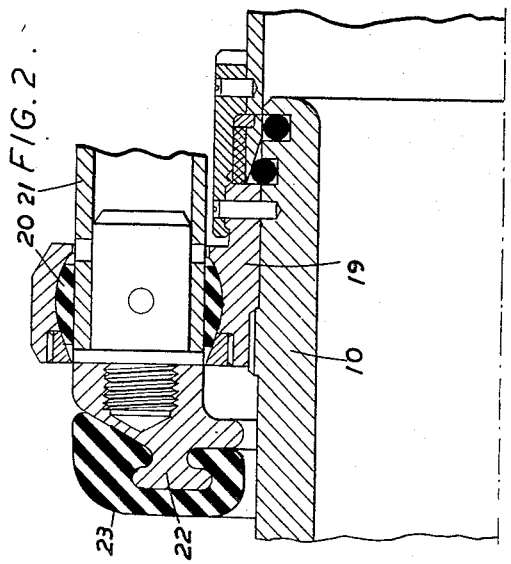
Inventor
Dennis W. Guiver
By Watson, Cole, Grindle & Watson
Attorney Patented Oct. 19, 1954

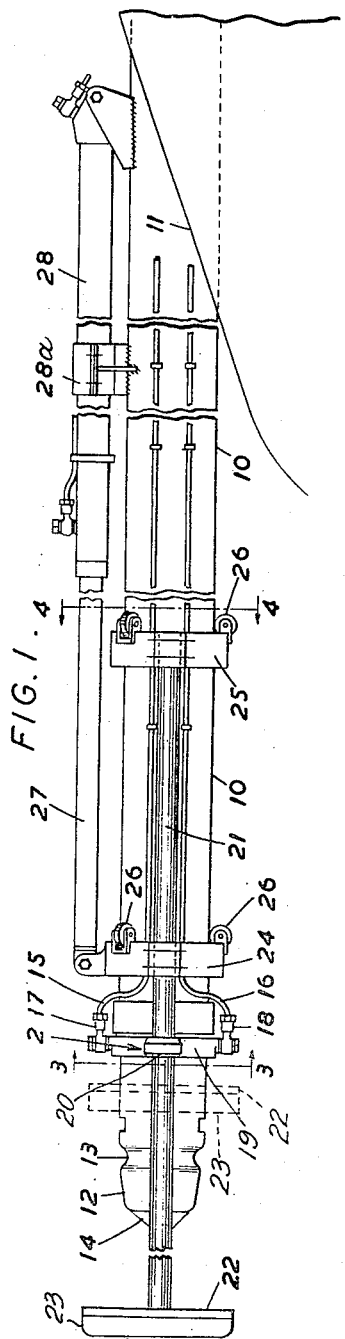

2,692,104

UNITED STATES PATENT OFFICE 2,692,104

APPARATUS FOR AIRCRAFT-REFUELING IN FLIGHT

Dennis William Guiver, Poole, England, assignor to Flight Refuelling Limited, London, England, a British company Application September 20, 1951, Serial No. 247,506

Claims priority, application Great Britain September 27, 1950

5 Claims. (Cl. 244—135)

This invention relates to an improvement or modification of the towing and/or flight-refuelling apparatus described in the specification of copending U. S. application Serial No. 153,198, hereinafter referred to as the parent specification.

The apparatus described in the parent specification comprises essentially a trailing connecting element extended rearwardly from the leading aircraft and a rigid connecting member (called a "probe") extended forwardly from the following aircraft; and one of these elements terminates in a coupling socket having springloaded latches, while the other element terminates in a plug-like coupling member constituting a nozzle or spigot having an external circumferential groove engageable automatically by the latches of the socket when the nozzle or spigot is thrust into the socket. The trailing element is either flexible being in the form of a hose or hawser or is a jointed or universally mounted telescopic pipe or rod structure, of which the extremity can swing vertically and laterally, and it is preferably provided with a drogue at or near its extremity which causes the trailing element, or at least the terminal part thereof, to trail substantially horizontally.

In the form of construction, to a modification or improvement of which the present invention relates, the plug-like coupling member is mounted on the "probe" and the socket on the trailing element.

The socket may, however, be recessed into a rearward facing part of the leading aircraft as described in the specification of co-pending U. S. application Serial No. 242,803, filed August 21, 1951.

The parent specification also describes a telescopic form of probe comprising an outer fixed tube and a slidable inner tube, which carries the nozzle or spigot and is movable by means of a motor-device, such as a hydraulic or pneumatic jack. This construction is intended to be operated as follows: the following aircraft approaches the leading aircraft (tanker, receiver or tug) from behind with the probe retracted, and the pilot aims the probe at the socket mounted on the extremity of the element (hose, pipe, hawser or towing rod) trailed by the leading aircraft; and when the nozzle or spigot is separated from the socket by a short distance, less than the stroke of the telescopic probe, the pilot of the following aircraft extends or "ejects" the probe to insert the nozzle or spigot into the socket and spring the latches of the socket into the groove of the nozzle or spigot. When the latches are engaged, the pilot of the following aircraft retracts the probe, at the same time "easing" his aircraft forwards, and when the probe is fully retracted he opens the nozzle-valve or operates a control to cause a latch-locking device to lock the latches. (In the construction particularly described in the parent specification the nozzle-valve cannot be opened until the probe is fully retracted.)

This construction exacts a serious weight penalty on account not only of the weight of the telescopic probe structure itself but also of the operating jack or motor, due to the considerable inertia of the movable part of the telescopic probe. Moreover, if the telescopic probe structure is constituted as part of a refuelling system, satisfactory solutions of the problem of sealing the sliding joint against leakage are not easily found.

An object of the present invention is to provide an equivalent structure from the point of view of the operational technique making use of a rigid, non-extensible probe, thus avoiding the need for sliding seals and affording a lighter structure and operating mechanism.

The improvement according to the present invention consists essentially in replacing the sliding, extendable or "ejectable" and retractable part of the probe by an external, slidably extendable and retractable structure terminating in a locating ring, preferably provided with a bufferring of rubber or the like substance, the probe itself, with its terminal, plug-like coupling nozzle or spigot, being a fixed non-extensible structure.

In the retracted position, the locating ring surrounds the tip of the probe, and the flared mouth of the coupling socket carried by the leading aircraft (or of a funnel-shaped drogue unitary with the socket) is wide enough to receive the locating ring. The latter, when in the extended position, makes contact with the interior of the socket mouth and serves to locate the probe in line with the socket, while the following aircraft is eased forwards relatively to the leading aircraft until the nozzle or spigot enters the socket and the latches engage the groove of the nozzle or spigot.

In one form of construction, the locating ring merely enters and makes contact with the mouth of the socket or drogue which, owing to air resistance or drag, offers resistance to the locating ring and, as the following aircraft advances after making contact, forces the ring back into the retracted position against the extending effort resiliently exerted by the jack or motor on the ring-supporting structure, an effort which must of course be less than the drag forces experienced by the socket or drogue. The motor-device can of course, and will usually, be put into reverse to retain the ring in the fully retracted position, as soon as the nozzle or spigot is latched to the socket.

In a modified form of construction, the locating ring and the socket or drogue are provided with self-engaging latching means operating similarly to those of the socket and the nozzle or spigot, in which case the ring may be positively retracted as soon as it has become latched to the socket or drogue, retraction being assisted by easing the following aircraft forwards.

Preferably, pneumatic power is used for extending and retracting the ring-supporting structure, since the expansion of the working fluid enables rapid extension or "ejection" to be achieved without incurring an unduly high rate of flow through the feed lines and valves, and because the fluid is expendable, rendering return circuits unnecessary.

By way of example only, a preferred form of construction is illustrated in the accompanying drawings, of which:

Figure 1 is a side elevation of the assembly comprising a non-extensible probe mounted in the nose of an aircraft and an extensible locating ring-supporting structure shown in the extended position;

Figure 2 is a scrap-section of a detail of Figure 1 (indicated thereon by arrow 2);

Figures 3 and 4 are transverse sections on the lines 3—3 and 4—4 respectively of Figure 1;

Figure 5 is a partly sectioned side elevation of a coupling socket for receiving the probe and locating ring of Figure 1.

In the form of construction illustrated, the rigid, forwardly extending, connecting member or "probe" comprises a tube 10 of a length such that when the contact is established the socket 29 is in the correct position relatively to the aircraft. Towards its rearward end this tube 10 is supported in any convenient manner on the aircraft structure so that the probe projects forwardly in the line of flight through the skin 11 of the aircraft; and at the extreme rear the tube 10 may be provided with a means for connection to the fuel system of the aircraft. The forward end of the tube terminates in a tapered nozzle 12 having an external circumferential groove 13 and fitted with a fuel valve 14, which may be either pneumatically, hydraulically or electrically operated, or in a towing spigot. In the example illustrated, the valve is operated by a double-acting hydraulic jack (not illustrated) located inside the tube 10 and connected to pipes 15, 16 through unions 17, 18. Surrounding and secured to the forward end of the tube 10, immediately to the rear of the groove 13, is a ring 19 having two lugs, one on each side of the tube, carrying spherically seated bushings 20 so positioned that tubular rods 21 fitted in them are normally parallel to and in the same plane as the tube 10. A locating ring 22 furnished with a rubber buffer 23 is rigidly attached to the two rods 21, which are slidably mounted in the bushings 20 in such a manner that the rods 21 and locating ring 22 can be extended forwardly from a position in which it surrounds the forward end of the rigid connecting member or "probe" 10, as indicated in dotted lines in Figure 1, through a short distance, e. g. 3 feet. The rods 21 are rigidly secured at an intermediate point of their length and at their rearward ends respectively to supporting rings 24, 25, which surround the tube 10 and are provided with a number of lugs carrying yieldable or flexible rollers 26, which roll on the tube 10 and enable the rings 24, 25, rods 21 and locating ring 22 to be moved backwards and forwards along the tube 10. In addition to lugs for attaching the sliding rods 21 to the supporting rings 24, 25 the supporting ring 24 has a further lug to which is attached the piston rod 27 of a pneumatic jack whose piston (not shown) is of the self-aligning type or is articulated to the rod 27. The cylinder 28 of the jack is secured to collars 28ª fixed to the tube 10. When pressure is applied to the rear side of the jack 27, 28 the locating ring 22 will be extended or "ejected" and when pressure is applied to the front side of the jack, the ring 22 will be retracted.

Slight misalignment of the locating ring 22 on making contact with the socket or drogue of the leading aircraft is compensated by the spherically seated bushings and by yielding of the flexible rollers 26; and shock-loading of the slidable assembly 21 to 25 and the probe tube 10, consequent on a misaligned contact, is damped by the flexible rollers 26, while the self-aligning piston or articulated piston rod of the pneumatic jack 27, 28 accommodates slight misalignment of the supporting ring 24 to which the piston rod 27 is secured.

The coupling socket trailed by the leading aircraft for receiving the locating ring 22 and probe tube 10 is illustrated in Figure 5 and comprises a socket body 29 and a hollow conical extension 35 constituting a drogue. It is provided with latch levers 30 terminating in rollers 31, the levers being pivoted on the socket body 29 and loaded by spring plungers 32 to extend through slots in the socket wall and thereby cause the rollers 31 to engage the groove 13 of the nozzle 12 as fully described in the parent specification. It is further provided with a second similar set of pivoted latch levers 33 loaded by spring plungers 34 to extend inwardly and trap the locating ring 22, the ends of the levers 33 being so shaped that the ring 22 can spring the levers apart and pass them as it advances, whereupon the levers spring back and engage behind the ring and trap it.

The coupling socket instead of being trailed by the leading aircraft on the end of a flexible hose or jointed pipe, as described in the parent specification, may be recessed into a rearward facing part of the aircraft as described in the specification of co-pending U. S. application Serial No. 242,803.

I claim:

1. In an aircraft, a non-extensible elongated, rigid connecting member extending forwardly from the aircraft substantially in the line of flight and terminating in a forwardly facing, plug-like coupling member insertable in a coupling socket carried by another aircraft, which socket is provided with a spring-loaded latching member, said plug-like coupling member having a tapered extremity and a circumferential groove for engagement by said spring-loaded latching member of the coupling socket, and in combination with said rigid connecting member a rigid locating ring, means for slidably mounting said locating ring on said connecting member for movement between a retracted position, in which said ring surrounds the forward end of said connecting member, and an extended position in which said ring lies in front of the forward end of said connecting member and concentric therewith, and power-operated means operatively connected to said mounting means for retracting and extending said locating ring.

2. The combination as defined in claim 1, in which the mounting means for the locating ring comprises rods disposed parallel to the rigid connecting member, said locating ring being attached to the forward ends of said rods, a supporting ring attached to said rods and rollers mounted on said supporting ring in resilient, rolling contact with said connecting member; the combination further including a ring member fixed to said connecting member, bushings supported by said last-named ring member, said rods being slidable in said bushings and said supporting ring surrounding said connecting member rearwardly of said bushings, and being operatively connected to the mentioned power-operated means.

3. The combination as defined in claim 2 including a second supporting ring surrounding said rigid connecting member and attached to the rearward extremities of said rods, and rollers mounted on said second supporting ring in resilient, rolling contact with said rigid connecting member.

4. The combination claimed in claim 1 in which said power-operated means for retracting and extending the locating ring comprises a pneumatic jack, the opposite ends of which are respectively operatively connected to a fixed part of the aircraft and to said locating ring.

5. In an aircraft, for cooperation with a non-extensible elongated, rigid connecting member and an extensibly mounted locating ring embodied in another aircraft; a coupling socket for receiving the forward end of the rigid connecting member, said socket being provided with a spring-loaded pivoted latching member engageable with the circumferential groove of the rigid connecting member and with another spring-loaded, pivoted latching member engageable with the locating ring.

References Cited in the file of this patent

UNITED STATES PATENTS

| Number | Name | Date |
|---|---|---|
| 1,183,719 | Bird | May 16, 1916 |
| 2,141,536 | Kelton | Dec. 27, 1938 |
| 2,199,588 | Cobham et al. | May 7, 1940 |
| 2,596,455 | Williams et al. | May 13, 1952 |